US006142551A

United States Patent [19]

Ciavaglia et al.

[11] Patent Number: 6,142,551

[45] Date of Patent: Nov. 7, 2000

[54] VEHICLE LIFTGATE POWER OPERATING SYSTEM

[75] Inventors: Michael Antonio Ciavaglia, Dearborn; Joseph Michael Johnson, Huntington Woods; Lloyd Walker Rogers, Jr., Shelby Township; Thomas Ralph Osborn, Dearborn Heights, all of Mich.

[73] Assignee: Delphi Technologies, Inc., Troy, Mich.

[21] Appl. No.: 09/233,862

[22] Filed: Dec. 17, 1998

[51] Int. Cl.[7] .......................... B60J 5/10

[52] U.S. Cl. .................. 296/56; 296/146.4; 296/146.8; 49/340

[58] Field of Search .................. 296/56, 146.4, 296/146.8, 146.11, 146.1; 49/340, 341, 342, 343; 74/89.17

[56] References Cited

U.S. PATENT DOCUMENTS

| | | | |
|---|---|---|---|
| 3,343,303 | 9/1967 | Wanless . | |
| 3,713,472 | 1/1973 | Dozois | 296/56 X |
| 6,055,775 | 5/2000 | Dering et al. | 296/56 X |
| 6,055,776 | 5/2000 | Dettling et al. | 296/56 X |

*Primary Examiner*—D. Glenn Dayoan
*Assistant Examiner*—Jason Morrow
*Attorney, Agent, or Firm*—Kathryn A. Marra

[57] ABSTRACT

A power operating system for opening and closing a vehicle liftgate has a pair of drive units supported on the vehicle frame and connected to the liftgate for opening and closing the liftgate. Each drive unit includes a bracket that is secured to the vehicle body for supporting several parts including a reversible electric motor, a gear train, a rack and a cradle that are mounted on the bracket. The electric motor drives the rack via an the output gear of the gear train that has an axis. The rack slides in the cradle which is pivotally mounted on bracket so that cradle pivots about the axis of the output gear to hold the teeth of the rack in engagement with the teeth of the output gear to accommodate rocking movement of rack as it moves from a retracted position to an extended position. An arcuate track that is fixed to the vehicle body, and an arcuate link slides in the arcuate track. The arcuate link has an inboard end that is pivotally connected to an end of the rack and an outboard end that is pivotally connected to the liftgate.

9 Claims, 2 Drawing Sheets

VEHICLE LIFTGATE POWER OPERATING SYSTEM

TECHNICAL FIELD

This invention relates to a power operating system for a vehicle liftgate that is pivotally attached to a vehicle roof for pivotal movement about a generally horizontal axis and more particularly to a power operating system that will move a liftgate from a closed position to a fully open position and from an open position to a fully closed position.

BACKGROUND OF THE INVENTION

Utility vehicles and vans with liftgates that are hinged at the top about a generally horizontal axis are used by large numbers of people today. Some of these liftgates are large and heavy. Their size and weight make some liftgates difficult to open and close. Some of the liftgates are also a great distance above the ground when they are fully opened. Their height above the ground makes them very difficult for some people to close. For these and other reasons many people would like to have a power operating system for opening and closing the liftgate.

A number of different liftgate openers have been tried in recent years. Some of these liftgate openers have a single cable that opens and closes a liftgate. Liftgates with a single cable opener and closer are generally trunk lids that are lightweight and have a relatively small range of movement.

Liftgates that have two or more gas cylinders for a counter balance system are common. These gas cylinders generally occupy a position in which their axis is substantially parallel to the liftgate so that the gas cylinders are hidden when the liftgate is closed. In this closed position the moment arm of the gas cylinders is quite small. With such systems the life gate may move about one-third of their total travel range before the gas cylinders exert sufficient force to open a liftgate further without the application of an independent lifting force. There are even some systems in which the gas cylinders pass over center and bias a liftgate toward a closed position when the liftgate is closed. With these self locking systems a liftgate may need to be more than one-third open before the gas cylinders will open the liftgate further.

The force required to hold a liftgate in a given position along its path of movement from a closed position to a fully open position varies substantially in some liftgate opening systems. A power liftgate closer must exert sufficient force to hold a liftgate in any given position along the path of movement, plus the force to overcome friction, and plus the force required to accelerate the liftgate during liftgate closing. If the total force exerted by the liftgate power closure varies substantially from one position between fully opened and closed to another position between fully opened and closed, it may be difficult for the control system to detect an obstruction and stop the liftgate without incurring damage to the vehicle or to the object that obstructs the liftgate.

SUMMARY OF THE INVENTION

The object of the invention is to provide an improved vehicle liftgate power operating system.

A feature of the invention is that the vehicle liftgate power operating system can move the liftgate from a closed position to a fully opened position as well as from an open position to a fully closed position.

Another feature of the invention is that the liftgate power operating system allows the liftgate to be moved manually when an efficient gear train is selected.

Another feature of the invention is that power operating system can be stopped at any point to hold the liftgate in an intermediate position without any need for a brake, detent or the like.

Still another feature of the invention is that the drive unit of the liftgate power operating system has a moveable link attached to the liftgate that is guided by a track that can be shaped to hug the interior roof structure and consequently maximize the unobstructed load height at the liftgate opening.

Still yet another feature of the invention is that the liftgate power operating system has a moveable link attached to the liftgate that can be shaped and guided to move concentrically with respect to the pivot axis of the liftgate so that the moveable link can be sealed easily. This also allows the exit for the moveable link to be located outside the liftgate perimeter seal.

These and other objects, features and advantages of the invention will become more apparent from the following description of a preferred embodiment taken in conjunction with the accompanying drawing.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 3:
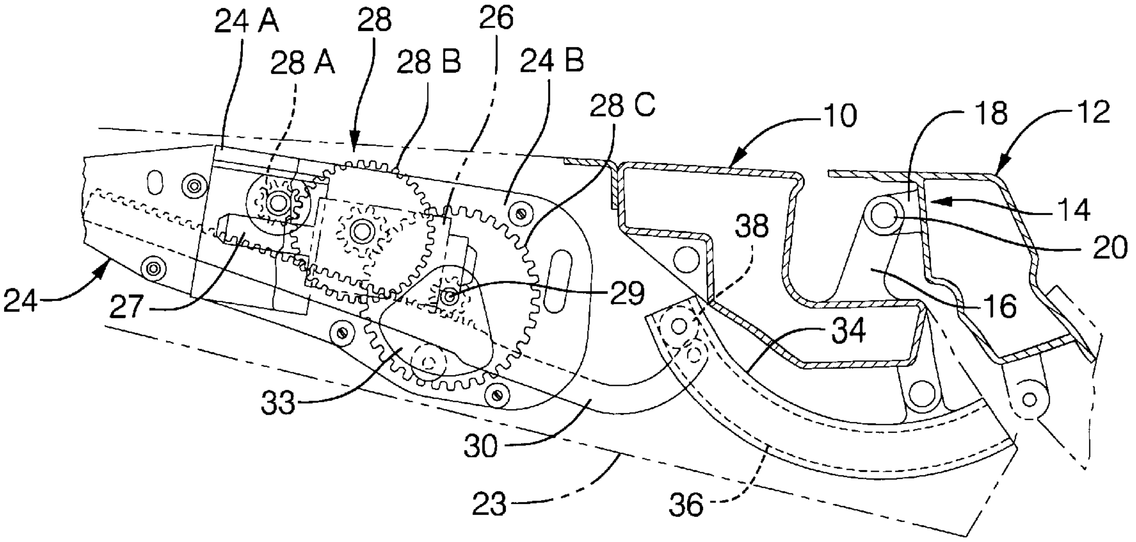
FIG. 3 is an enlarged view showing the power operating system when the liftgate is closed.
Figure 2:
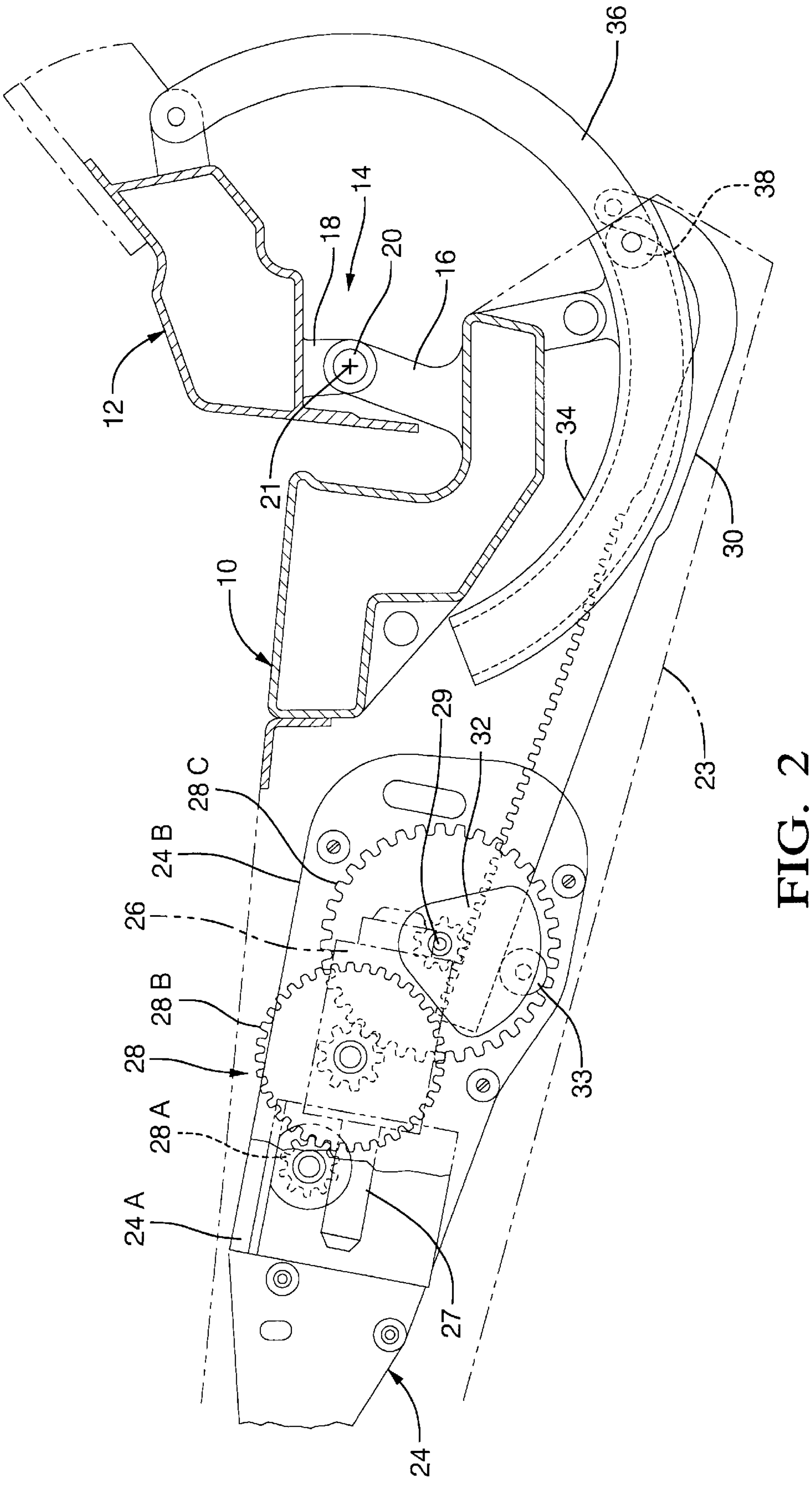
FIG. 2 is an enlarged view of the power operating system taken substantially along the line 2—2 of FIG. 1 showing the liftgate in the fully open position.

Vehicle 10 has a liftgate 12 that is attached to the aft end of the vehicle roof by two hinge assemblies. The typical right hand hinge assembly 14 is shown in FIGS. 2 and 3.

Hinge assemblies 14 have hinge portions 16 that are secured to the vehicle 10 and hinge portions 18 that are secured to the liftgate 12. Hinge portions 18 are attached to hinge portions 16 by pivot pins 20 so that liftgate 12 pivots about a pivot axis indicated at 21 in FIGS. 2 and 3 from a raised open position shown in FIG. 2 to a closed position shown in FIG. 3. Pivot axis 21 is generally substantially horizontal and liftgate 12 is generally permitted to pivot about 90° about pivot axis 21. However, the range of movement can be varied substantially from one vehicle 10 to another.

Lift gate 12 is opened and closed by a power operating system that includes two indentical drive units 22 that are installed in the aft end of the vehicle roof. Drive units 22 are laterally spaced from each other and near the respective vertical body pillars at the aft end of vehicle 10 that define the rear opening that is closed by lift gate 12. The typical drive unit 22 is shown in FIGS. 2 and 3 with the cover 23 removed to show internal detail.

Each drive unit 22 comprises a bracket 24 that is secured to the vehicle body in a fixed position for supporting several parts including a reversible electric motor 26, a gear train 28, a rack 30 and a cradle 32 that are mounted on bracket 24. Bracket 24 has two parallel plates 24*a* and 24*b*. Electric motor 26 is attached to the outboard side of bracket 24*b*. It has a worm gear output 27 that drives a compound pinion gear 28*a* that is located between bracket plates 24*a* and 24*b*. Pinion gear 28*a* in turn drives a compound intermediate gear 28*b* which in turn drives a compound output gear 28*c* to provide a first stage of speed reduction and torque multiplication. Output gear 28*c* drives rack 30 to provide a second stage of speed reduction and torque multiplication. Gears 28*b*, 28*c* and rack 30 are located between bracket plates 24*a* and 24*b*.

Rack 30 slides in cradle 32 on roller 33. Cradle 32 is pivotally mounted on bracket 24 between plates 24*a* and 24*b* so that cradle 32 pivots about the axis 29 of output gear 28*c*. The purpose of cradle 32 is to hold the teeth of rack 30 in engagement with the teeth of the output gear 28. This is necessary to accommodate a slight rocking movement of rack 30 as it moves from the retracted position shown in FIG. 2 to the retracted position shown in FIG. 3.

Each drive unit 22 further includes a track 34 and a moveable link 36 that is pivotally attached to the liftgate 12 and guided by track 34. Track 34 is secured to the vehicle body in a fixed position and is preferably shaped to hug the aft end of the vehicle roof, particularly the box beam that carries the hinge portions 16 as best shown in FIGS. 2 and 3, in order to maximize unobstructed load height at the liftgate opening.

Track 34 is also preferably arcuately shaped with a radius of curvature that is centered on the hinge axis 21 of lift gate 12. Link 36 is also preferably arcuately shaped with a curvature that matches that of track 34 so that link 36 slides back and forth in track 34 pivoting about axis 21 between the extended position shown in FIG. 2 and the retracted position shown in FIG. 3. This concentric path of movement enables link 36 to be sealed at the vehicle body exit easily and even allows the body exit for link 36 to be placed in the vertical body pillar outside the liftgate perimeter seal (not shown). The inboard end of link 36 is pivotally connected to the end of rack 30 and the outboard end of link 36 is pivotally connected to liftgate 12. The inboard end of link 36 may carry a roller 38 to facilitate sliding movement on track 34.

The power operating system further includes a conventional power source such as the vehicle battery (not shown) and a suitable motor control for energizing and shutting off the reversible electric motor 26. Motor controls are well known to those skilled in the art and thus need not be described in detail.

Figure 1:
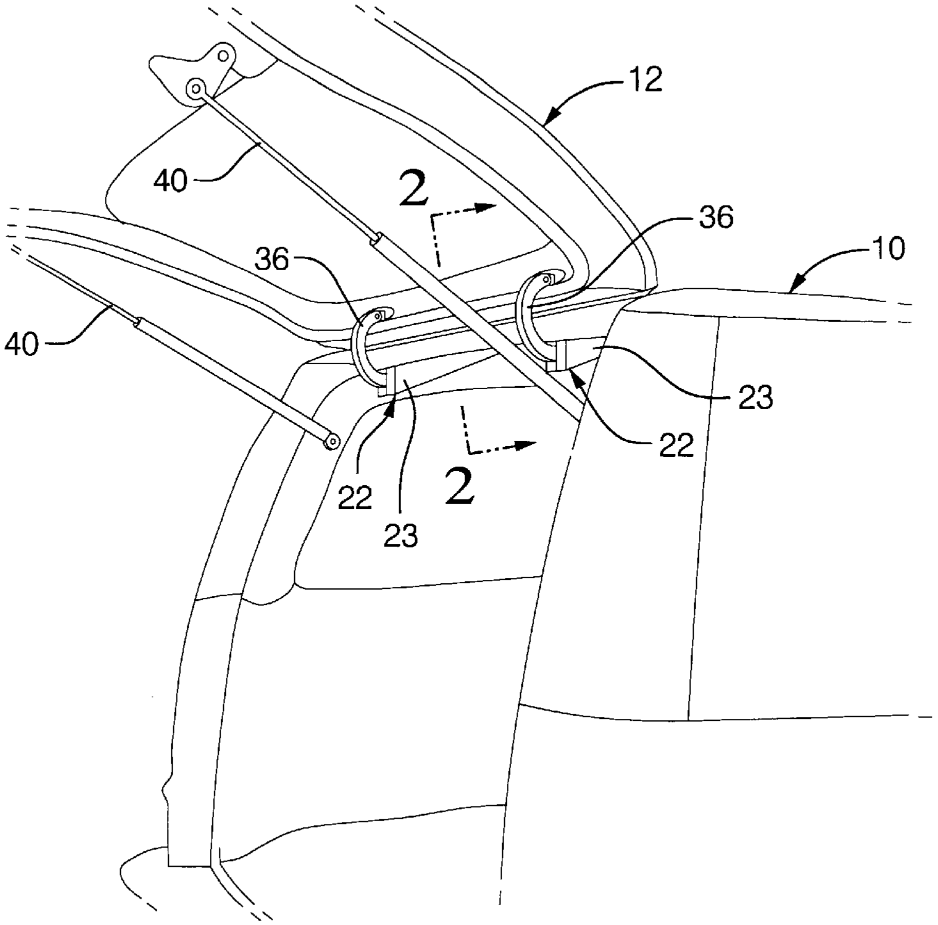
FIG. 1 is a perspective view of the rear portion of a vehicle with an open liftgate.

The power operating system operates as follows. Assuming that the liftgate 12 is open as shown in FIG. 2, electric motor 26 is energized to close liftgate 12. Electric motor 26 is energized to rotate pinion gear 28*a* clockwise. Pinion gear 28*a* in turn rotates intermediate gear 28*b* counterclockwise. This rotates output gear 28*c* clockwise driving rack 30 from the extended position shown in FIG. 2 to the retracted position shown in FIG. 3. This slides link 36 in track 34 from the extended position shown in FIG. 2 to the retracted position shown in FIG. 3 lowering liftgate 12 from the raised open position shown in FIGS. 1 and 2 to the closed position shown in FIG. 3. When the liftgate 12 is fully closed, a limit switch or the like is actuated to shut off electric motor 26. Liftgate 12 is opened by reversing electric motor 26 so that gear train 28*a*, 28*b*, 28*c* drives rack 30 and link 36 to the extended position shown in FIGS. 1 and 2.

With a proper motor control circuit, electric motor 26 can be deenergized at any time in which case liftgate 12 can be stopped at any intermediate position and held in the intermediate position by the friction in gear train 28 without any need for a brake, detent or the like. The liftgate 12 can then be moved by energizing electric motor 26 or the liftgate 12 can then be moved manually because gear train 28 can be designed with sufficient efficiency to permit back drive to electric motor 26.

The power operating system can be designed to work alone or in conjunction with gas cylinders 40 which are well known in the art with the primary adjustment being the size of the electric motor 26.

The power operating system described above preferably includes two identical drive units 22 for balanced operation and reduced manufacturing costs. However, the drive units need not be identical and in some instances, a single drive unit may be sufficient.

It is also possible to use two drive units with a single reversible electric motor driving both gear trains 28. In such an arrangement the axis of the electric motor is parallel to the axis of the several gears of gear train 28 thereby eliminating the need for a cross axis gear arrangement and possible need for a clutch in order to back drive the electric motor and thus operate the liftgate manually. The same is true with a power operating system having two identical drive units where the axes of the individual electric motors 26 are parallel to the axes of the respective drive trains.

Obviously, many modifications and variations of the present invention in light of the above teachings may be made. It is, therefore, to be understood that, within the scope of the appended claims, the invention may be practiced otherwise than as specifically described.

We claim:

1. A power operating system for opening and closing a vehicle liftgate that is pivotally attached to an aft end of a vehicle roof for pivotal movement about a generally horizontal hinge axis comprising:

at least one drive unit that includes a reversible electric motor, a rack driven by the electric motor, a track and a moveable link that is guided by the track, the link being pivotally attached to the liftgate at one end and to the rack at the other end.

2. The power operating system as defined in claim 1 wherein the drive unit includes a gear train between the electric motor and the segmented rack and wherein the gear train has sufficient friction to hold the vehicle liftgate in an intermediate position.

3. The power operating system as defined in claim 2 wherein the gear train has efficiency that enables manual movement of the vehicle liftgate away from the intermediate position.

4. The power operating system as defined in claim 1 wherein the vehicle liftgate exposes a liftgate opening in an open position and wherein the track is shaped to hug the aft end of the vehicle roof to increase unobstructed load height at the liftgate opening when the liftgate is in an open position.

5. The power operating system as defined in claim 1 wherein the track is arcuately shaped with a radius of curvature that is centered on the hinge axis and the link is also arcuately shaped with a curvature that matches that of the track so that the link slides back and forth in the track pivoting about the hinge axis.

6. A power operating system for opening and closing a vehicle liftgate comprising:

a vehicle frame and an access opening;

a liftgate pivotally attached to the vehicle frame adjacent to the top of the access opening for pivotal movement about a generally horizontal axis;

a drive unit supported on the frame and connected to the liftgate for opening and closing the liftgate, the drive unit comprising a bracket that is secured to the vehicle body for supporting several parts including a reversible electric motor, a gear train, a rack and a cradle that are mounted on the bracket, the electric motor having an output that drives the rack via the output gear of the gear train that has an axis, the rack being slidable in the cradle, the cradle being pivotally mounted on the bracket so that cradle pivots about the axis of the output gear to hold the teeth of the rack in engagement with the teeth of the output gear to accommodate rocking movement of rack as it moves from a retracted position to an extended position, an arcuate track that is fixed to the vehicle body, and an arcuate link that slides in the arcuate track, the arcuate link having an inboard end that is pivotally connected to an end of the rack and an outboard end that is pivotally connected to the liftgate.

7. The power operating system as defined in claim 6 wherein the arcuate track has a radius of curvature that is centered on the hinge axis of the lift gate and the arcuate link has a curvature that matches that of the track so that link slides in the track from a retracted position to an extended position.

8. A power operating system for opening and closing a vehicle liftgate comprising:

a vehicle frame and an access opening;

a liftgate pivotally attached to the vehicle frame adjacent to the top of the access opening for pivotal movement about a generally horizontal axis;

a pair of drive units supported on the frame and connected to the liftgate for opening and closing the liftgate, each drive unit comprising a bracket that is secured to the vehicle body for supporting several parts including a reversible electric motor, a gear train, a rack and a cradle that are mounted on the bracket, the electric motor having an output that drives the rack via an output gear of the gear train that has an axis, the rack being slidable in the cradle, the cradle being is pivotally mounted on bracket so that cradle pivots about the axis of the output gear to hold the teeth of the rack in engagement with the teeth of the output gear to accommodate rocking movement of rack as it moves from a retracted position to an extended position, an arcuate track that is fixed to the vehicle body, and an arcuate link that slides in the arcuate track, the arcuate link having an inboard end that is pivotally connected to an end of the rack and an outboard end that is pivotally connected to the liftgate.

9. The power operating system as defined in claim 8 wherein the arcuate track has a radius of curvature that is centered on the hinge axis of the lift gate and the arcuate link has a curvature that matches that of the track so that link slides in track from a retracted position to an extended position.

* * * * *